United States Patent [19]

Suzuki et al.

[11] Patent Number: 5,386,581
[45] Date of Patent: Jan. 31, 1995

[54] MULTIMEDIA DATA EDITING APPARATUS INCLUDING VISUAL GRAPHIC DISPLAY OF TIME INFORMATION

[75] Inventors: Kisoko Suzuki, Neyagawa; Hidemasa Kitagawa, Toyonaka; Koichiro Endo, Osaka; Yoshihiro Mori, Hirakata, all of Japan

[73] Assignee: Matsushita Electric Industrial Co., Ltd., Osaka, Japan

[21] Appl. No.: 115,831

[22] Filed: Sep. 3, 1993

Related U.S. Application Data

[63] Continuation of Ser. No. 500,543, Mar. 28, 1990, abandoned.

[30] Foreign Application Priority Data

Mar. 28, 1989 [JP] Japan .................................. 1-077562
Oct. 13, 1989 [JP] Japan .................................. 1-266483

[51] Int. Cl.$^6$ .............................................. G06F 3/00
[52] U.S. Cl. ............................... 395/800; 395/100; 395/140; 395/146; 364/419.17; 364/225.6; 364/225.8; 364/226; 364/DIG. 1; 360/19.1; 360/23
[58] Field of Search ............... 395/800, 425, 325, 162, 395/155, 153, 147, 146, 140, 100; 364/188-192, 419.07, 419.17, 419.19; 369/19-34; 360/19.1, 23

[56] References Cited

U.S. PATENT DOCUMENTS

| | | | |
|---|---|---|---|
| 4,215,343 | 7/1980 | Ejiri et al. | 340/711 |
| 4,375,083 | 2/1983 | Maxemchuk | 395/2 |
| 4,476,543 | 10/1984 | Quinones et al. | 395/325 |
| 4,658,427 | 4/1987 | Aubin | 381/124 |
| 4,853,867 | 8/1989 | Matsumura | 364/474.22 |
| 4,976,182 | 12/1990 | Obuchi et al. | 84/462 |
| 4,991,159 | 2/1991 | Tomoda et al. | 369/19 |
| 5,007,005 | 4/1991 | Hatakeyama et al. | 364/521 |
| 5,040,234 | 8/1991 | Yamamoto et al. | 388/811 |

FOREIGN PATENT DOCUMENTS 268270 5/1988 European Pat. Off. .
291028 11/1988 European Pat. Off. .

OTHER PUBLICATIONS

Journal of the Society of Motion Picture Engineers, vol. 95, No. 5, May 1986, New York U.S., pp. 567–571; J. Borish et al.: "Soundroid: A New System for Electronic Post-Production of Sound".

IBM Techical Disclosure Bulletin, vol. 30, No. 10, Mar. 1988, New York U.S., pp. 351–353; "Three-Level Audio Object Display for a Personal Computer Audio/Editor".

Rundfunktechnische Mitteilungen, vol. 30, No. 6, Nov. 1986, Norderstedt DE pp. 281–287, A. Schertz et al.; "Ein Graphik-Display fur Schnittsysteme".

*Primary Examiner*—Alyssa H. Bowler
*Assistant Examiner*—Alpesh M. Shah
*Attorney, Agent, or Firm*—Wenderoth, Lind & Ponack

[57] ABSTRACT

A data editing apparatus includes a mass storage device to edit multimedia data such as picture, audio, text and other data. By the visual graphic display of the time positions of the edited information, the user can easily grasp the reproduction time of the picture, text and audio data, thereby simplifying synchronization of plural media data. Graphic editing may be effected to facilitate multimedia data editing.

3 Claims, 5 Drawing Sheets

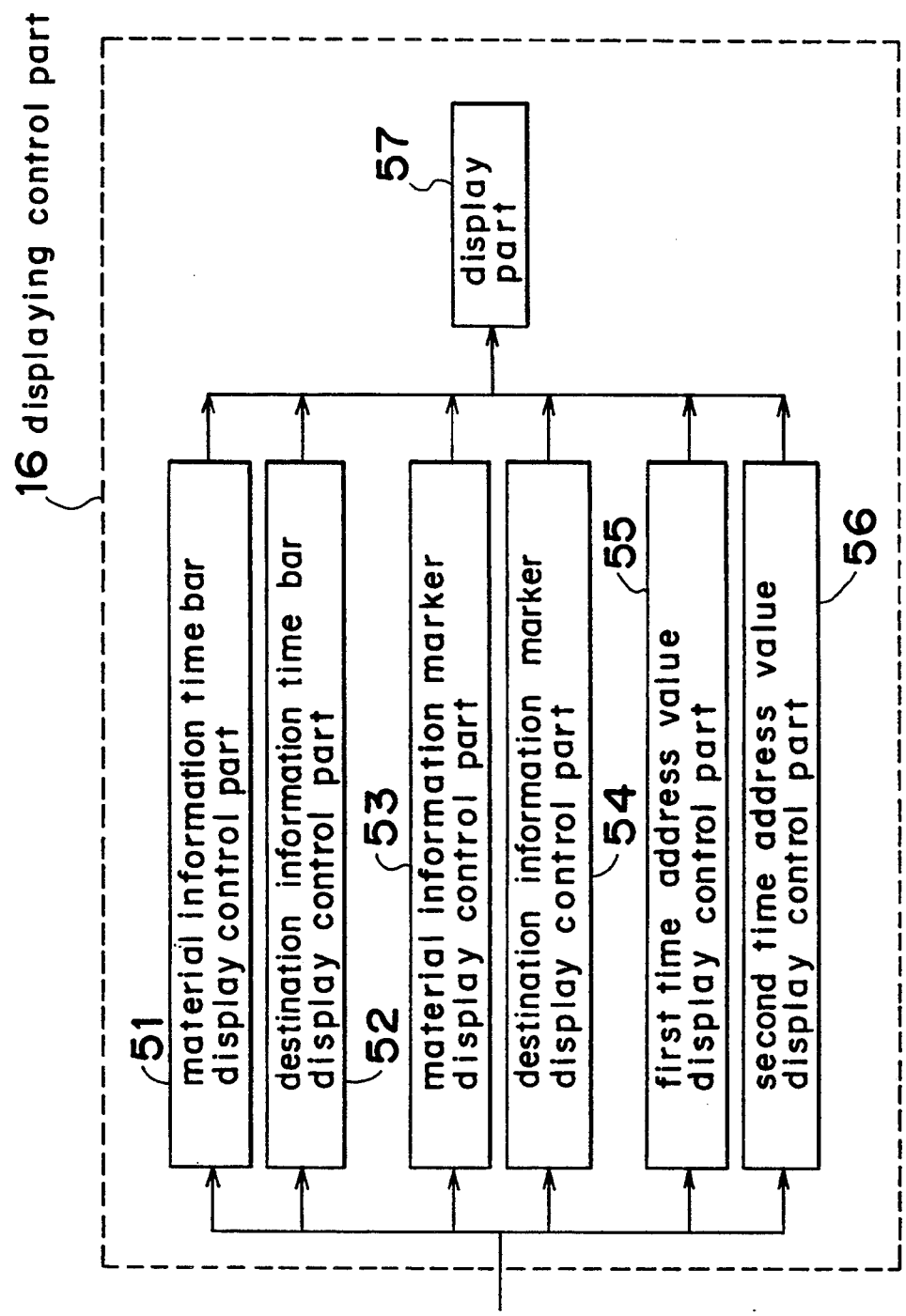

MULTIMEDIA DATA EDITING APPARATUS INCLUDING VISUAL GRAPHIC DISPLAY OF TIME INFORMATION

This application is a continuation of now abandoned application, Ser. No. 07/500,543, filed Mar. 28, 1990, now abandoned.

BACKGROUND OF THE INVENTION

The present invention generally relates to a data editing apparatus which is adapted to effect a digital editing operation of information such as moving picture data, still picture data, audio data, text data and so on.

In recent years, the development of data editing apparatuses having mass data storage device has progressed to effect editing operations picture, audio and other information. Various applications for such editing of picture, audio and other information also developed.

Some conventional data editing apparatuses edit picture data, for example, through the inputting and outputting operations of time codes as numeral values.

FIG. 4 is a block diagram showing the construction of the conventional data editing apparatus. In FIG. 4, reference numeral 41 is an input part, in which the user inputs instructions, reference numeral 42 is a data storage part for storing audio and picture data, reference numeral 43 is a control part for reading the picture and audio data from the data storage part 42 in accordance with the input signals from the input part 41, reference numeral 44 is an output part which is adapted to receive the picture data and the audio data from the data storage part 42 in accordance with the input signals from the input part 41, and to effect the display and audio outputting operations.

The operation of the conventional data editing apparatus constructed as hereinabove will now be described.

The file names of the outputting picture data and audio data, and the output timings are inputted from the input part 41. The control part 43 reads the picture and audio data from the data storage part 42 in accordance with the input data from the input part 41. The read data is fed into the output part 44 to effect a series of picture display and audio output operations.

However, in such a configuration as described hereinabove, the reproduction time of the picture and auto data is handled using numeral values, thus making it difficult to correspond; the time and the data, whereby a problem arises in that synchronization of the picture and audio media is difficult to effect.

SUMMARY OF THE INVENTION

Accordingly, the present invention has been developed with a view to substantially eliminating the above discussed drawbacks inherent in the prior art data editing methods and has for its essential object to provide an improved data editing method.

Another important object of the present invention is to provide an easier method for editing multimedia data of the type referred to above, comprising the steps of grasping the reproducing time of the picture, text and audio data by the visual expression of the time positions of the information, thereby simplifying the synchronization of a plurality of media data, and making it possible to effect the graphic editing.

In accomplishing these and other objects, according to one preferred embodiment of the present invention, the data editing system of the present invention comprises a plurality of information storage parts for storing a plurality of material information and destination information with the material information being arranged in a time system; an input part for outputting, by the operations of a user, the construction information for specifying one material information from the plurality of material information so as to indicate the specific area of the specified material information, the arrangement information showing the arrangement condition in the destination information of the specific area of the material information indicated by the construction information, and the indication information showing a processing method of a time address value showing the address value of the information of the material information with the time being provided as a unit, the material information, and the destination information; a control part for selecting the material information from the plurality of information storage parts in accordance with the composition information outputted from the input part, arranging in the time system the material information selected in accordance with the arrangement information outputted from the input part so as to produce the destination information, storing them in the corresponding information storage part; a display control part for effecting a material information graphic display operation of picture-outputting the material information graphics having the area proportional to the information amount of the plurality of material information, a destination information graphic display operation of arranging in parallel the destination information graphics having the area proportional to the information amount of the plurality of destination information so as to effect the picture outputting operation, a first digital display operation of digitally displaying the time address value in the indication point on the material information graphic indicated in accordance with the indication information from the input part, and a second digital display operation of digitally displaying the time address value in the indicating point on the destination information graphics indicated in accordance with the indication information from the input part; and a synchronization control output part for synchronizing in time the plurality of destination information to be stored in the plurality of information storage part in accordance with the the respective arrangement information and the indication information from the input part.

In accordance with the above described construction, the present invention includes the display control part calculating the respective information amount in a plurality of stored material information and the information amount of the destination information so as to display, outputting the information graphics having the area proportional to the information amount, and in addition, expressing the information of the plurality of material information and destination information so as to allow the visual expression of the time positions of the information, and the user may easily grasp the reproduction time. By the use of the present invention, the synchronization of the picture, text and audio data may be effected, the position to be partially reproduced may be easily specified, and the position to be edited may be easily specified. Further, by the use of the marker, it is possible to visually store the time address value, to simplify the positional specification of the information, and to easily effect the editing operation, thus resulting in extremely advantageous practical effects.

BRIEF DESCRIPTION OF THE DRAWINGS

These and other objects and features of the present invention will become apparent from the following description taken in conjunction with the preferred embodiment thereof with reference to the accompanying drawings, in which;

FIG. 5 is a block diagram showing the construction of the display control part 16 of FIG. 1.

DETAILED DESCRIPTION OF THE INVENTION

Figure 1:
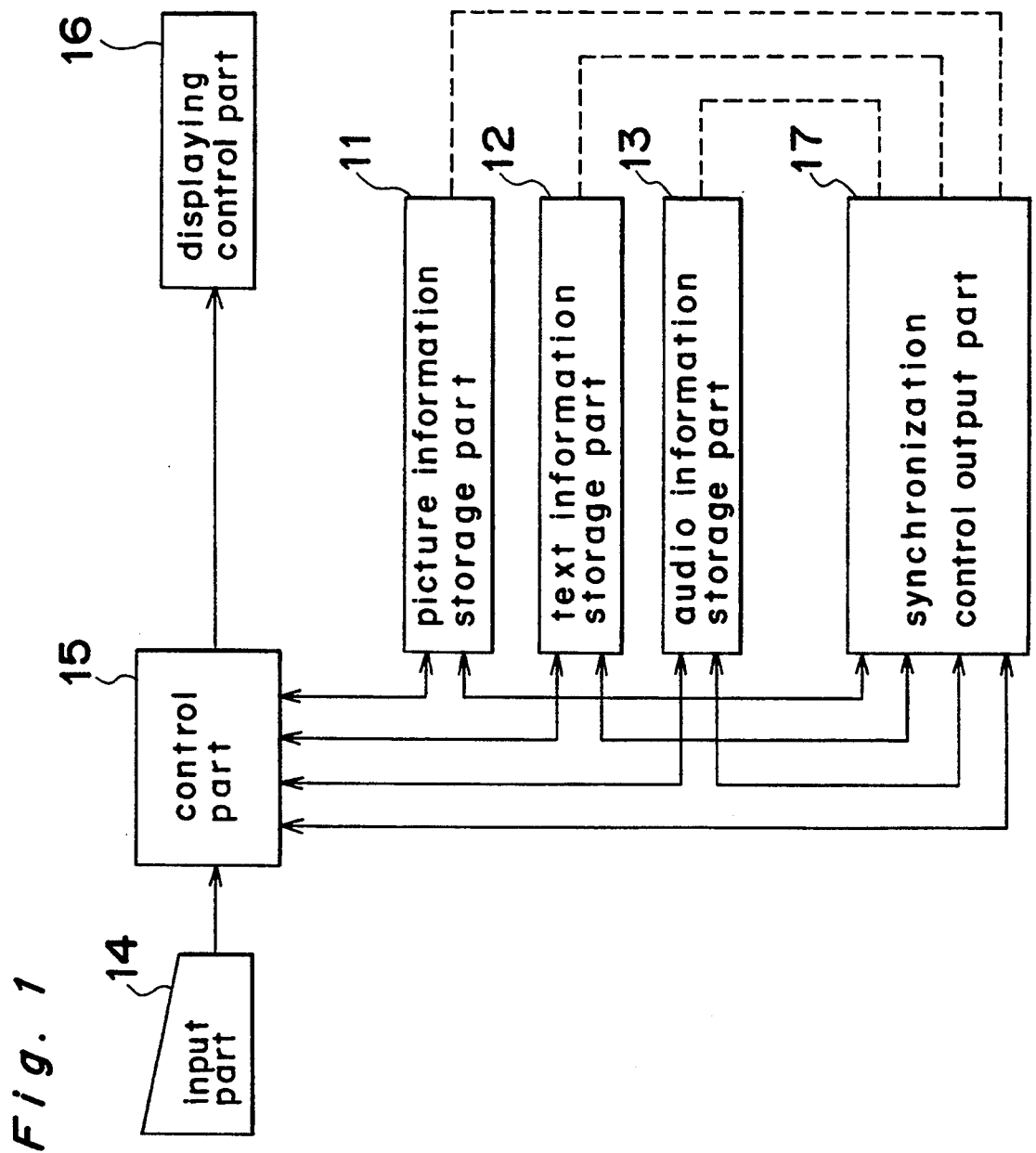
FIG. 1 is a block diagram showing the construction of a data editing apparatus in one embodiment of the present invention.

Before the description of the present invention proceeds, it is to be noted that like parts are designated by like reference numerals throughout the accompanying drawings.

In the present embodiment, the present invention is applied to a data editing apparatus and a method constructed with a work station having a mass storage memory for storing the digital information. An application which makes a video presentation of a dress and its accessories will be described by way of an example.

Referring now to the drawings, there is shown in FIG. 1, a block diagram of a data editing apparatus according to one preferred embodiment of the present invention, which includes a picture information storage part 11 for storing in the mass storage apparatus a plurality of material picture information and destination picture information with the plurality of material picture information being arranged in a time system, a text information storage part 12 for storing on the mass storage apparatus a plurality of material text information and destination text information with the plurality of material text information being arranged in a time system, an audio information storage part 13 for storing in the mass storage apparatus a plurality of material audio information and destination audio information with the plurality of material audio information being arranged in a time system, an input part 14 for outputting, in response to the operations of the user, construction information for specifying one material information from the plurality of material information so as to indicate the specific area of the specified material information, the arrangement information showing the arrangement condition in the destination information of the specific area of the material information indicated by the construction information, and indication information showing a method of processing the time address value showing the address value of the information of the material information with the time as a unit, the material information and the destination information; a control part 15 for selecting the material information from the respective information storage parts 11, 12, 13 in accordance with the construction information outputted from the input part 14, and arranging in the time system the material information selected in accordance with the arrangement information outputted from the input part 14 to produce the destination information so as to store it into the corresponding information storage parts 11, 12, 13, a display control part 16 for effecting a material information graphics displaying operation of picture-outputting the material information graphics having the, area proportional to the information amount of the plurality of material information, a destination information graphics displaying operation of arranging in parallel the destination information graphics having the area proportional to the information amount of the plurality of destination information so as to effect the picture outputting operation, a first digital display operation of digitally displaying the time address value in the indication point on the material information graphics indicated in accordance with the indication information from the input part 14, and a second digital display operation of digitally displaying the time address value in the indication time on the destination information graphics indicated in accordance with the indication information from the input part 14, and a synchronization control output part 17 for effecting the time synchronization of the plurality of destination information stored in the plurality of information storage parts 11, 12, 13 in accordance with the respective arrangement information and the indication information from the input part 14 so as to effect the reproducing operation.

Specifically, the material picture information to be stored in the picture information storage part 11 is approximately one minute moving pictures for introducing dresses of certain design. The destination picture information is a united dress catalog picture information with the short-time moving pictures of various types of design dresses being combined in it. The material text information to be stored in the text information storage part 12 is a text catalog for illustrating the materials, sizes, colors and so on of dresses of a certain design. The destination text information is the united dress catalog text information combined so that the text catalog of design dresses of the various types may become a story. The material audio information to be stored in the audio information storage part 13 is approximately one minute music. The destination audio information is a united dress catalog audio information with the various type of short-time music being combined in it.

FIG. 5 is a block diagram showing the construction of the display control part 16 of FIG. 1 of the present embodiment. In FIG. 5, reference numeral 51 is a material information time bar display control part for effecting the material information graphics display operation of picture-outputting the material information graphics having an area proportional to the information amount of the plurality of material information, reference numeral 52 is a destination information time bar display control part for effecting the destination information graphics display operation of arranging in parallel the destination information graphics having an area proportional to the information amount of the plurality of destination information so as to effect the picture outputting operation, reference numeral 53 is a material information marker display control part for repeatedly displaying graphics showing the time address value on the material information graphics, reference numeral 54 is a destination information marker display control part for effecting an operation of repeatedly displaying graphics showing the time address value on the destination information graphics, reference numeral 55 is a first time address value display control part for effecting a first digital display operation of digitally displaying the time address value in an indication point on the material information graphics indicated in accordance with the indication information from the input part 14, reference numeral 56 is a second time address value display control part for effecting a second digital display operation of digitally displaying the time address value in an indication point on the destination information graphics indicated in accordance with the indication, information from the input part 14, and reference numeral 57 is a display part for displaying on one picture face what is produced by each of the display control operation parts. The display control part 16 is composed of the material information time bar display control part 51, the destination information time bar display control part 52, the material information marker display control part, the destination information marker display control part, the first time address display control part, the second time address display control part, and the display part.

The data editing apparatus constructed as described hereinabove will be described hereinafter in its operation with the use of FIG. 1, FIG. 2, and FIG. 3.

Figure 2:
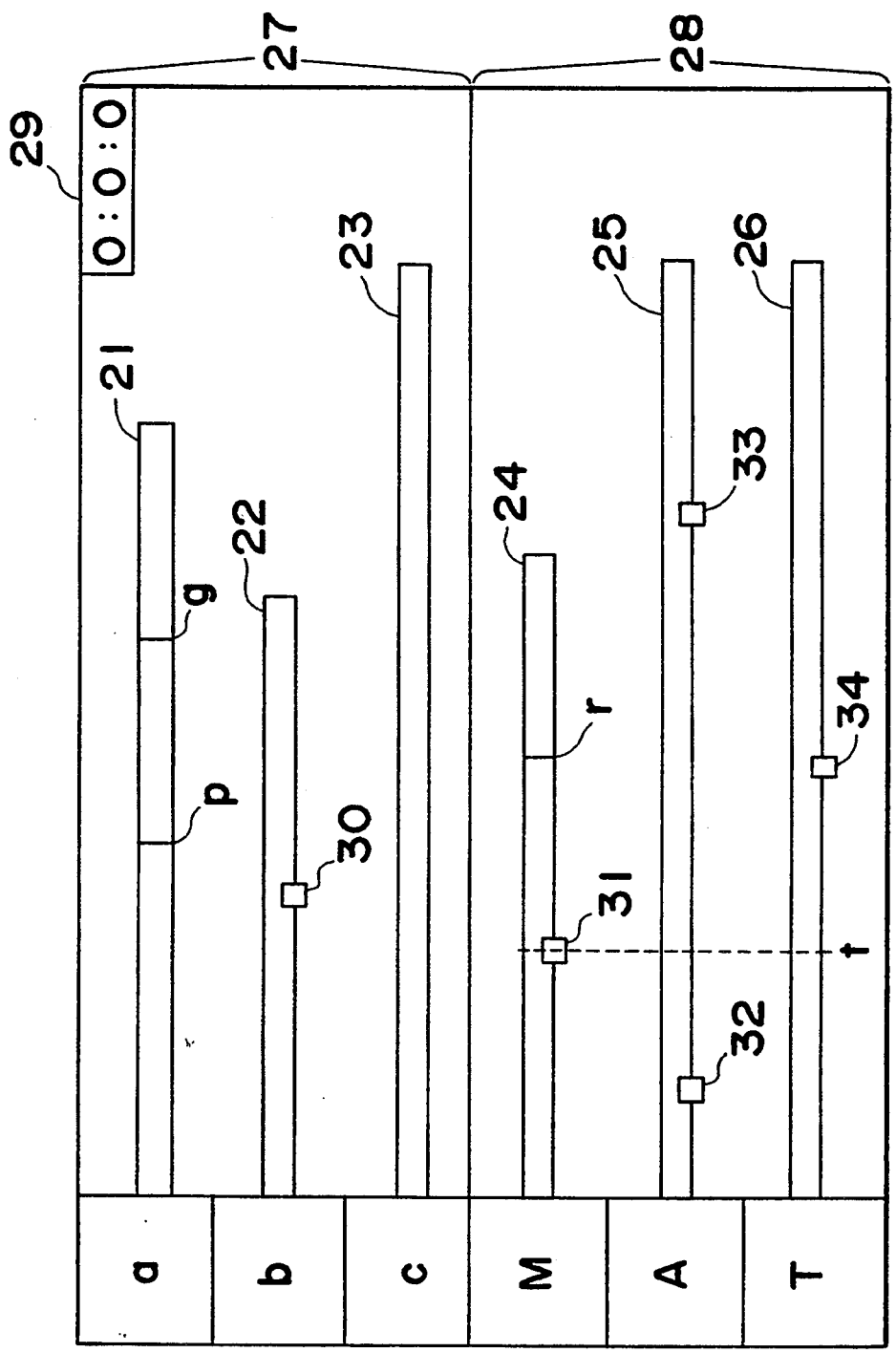
FIG. 2 and FIG. 3 are charts each showing the picture face construction of the editing picture face of the data editing apparatus of the present invention.

FIG. 2 is a graph showing the picture face construction of the edition picture face displayed on the display control part 16. The reference numerals 21, 22, 23 in FIG. 2 are the material information time bars with the information amount of the material information being converted into the area, reference numerals 24, 25, 26 are the destination information time bars having the area proportional to the information amount of the destination information, reference numeral 27 is the material information display portion with the material information time bars 21, 22, 23 being display on it, reference numeral 28 is the destination information display portion with the destination information time bars 24, 25, 26 being displayed on it, reference numeral 29 is a time display portion for digitally displaying the time address value of the information among the indication information, reference numerals 30, 31, 32, 33, 34 are markers for displaying the optional time address value on the time bar, reference character a is a first material information, reference character b is a second material information, reference character c is a third material information, reference character M is the destination information of the picture, reference character A is the destination information of the audio, reference character T is the destination information of the text. The time bars are represented with such bars as shown in the drawing. The reproduction time is calculated from the information amount of the material information and the destination information, and the transfer speed thereof so as to convert them into the lengths. Therefore, the lengths are proportional to the reproduction time. Here, the material information of the a, b, c is read, displayed from the picture information storage part 11 with the plurality of picture material information being stored therein.

Figure 3:
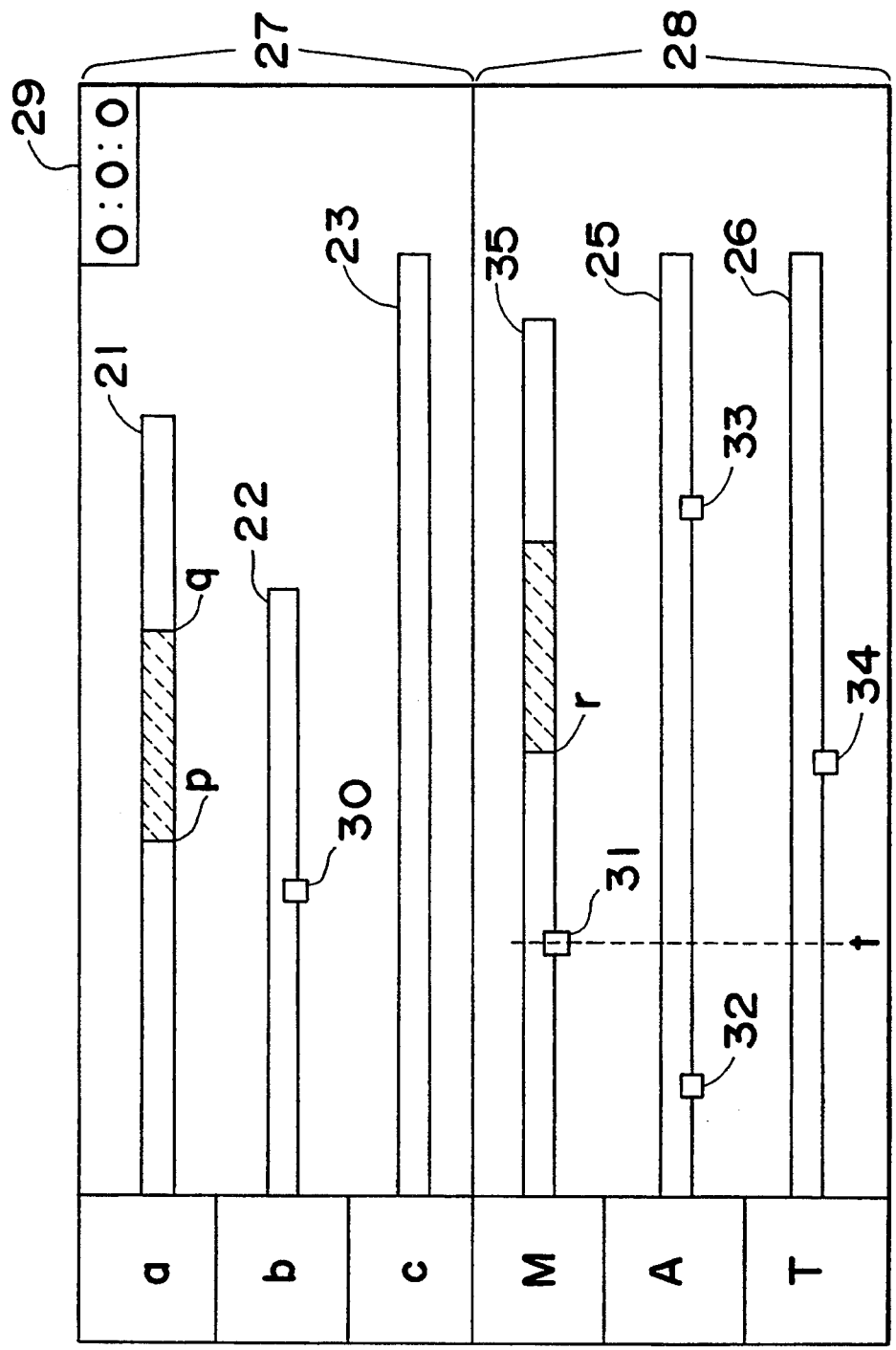
Figure 4:
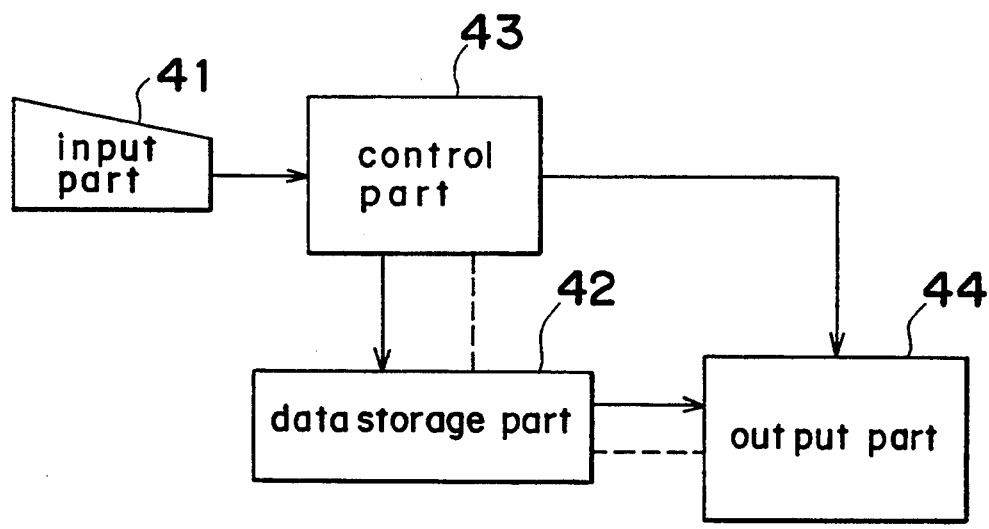
FIG. 4 is a block diagram showing the basic construction of the conventional data editing apparatus.

FIG. 3 is a graph showing the picture face construction of the edition picture face after the insertion edition to be displayed on the display control part 16. In FIG. 3, reference numerals 21, 22, 23 are the material information time bars, reference numerals 35, 25, 26 are the destination information time bars. Reference numeral 35 is a time bar after the edition of the time bar 24 of FIG. 2. Reference numeral 27 is the material information display portion displaying the material information time bars 21, 22, 23, reference numeral 28 is the destination information display portion displaying the destination information time bars 24, 25, 26, reference numeral 29 is a time display portion for digitally displaying the time address value among the indication information. Reference numerals 30, 31, 32, 33, 34 are markers, reference character a is a first material information, reference character b is a second material information, reference character c is a third material information, reference character M is the destination information of the picture, reference character A is the destination information of the audio, and reference character T is the destination information of the text.

When an optional point p on the time bar or an optional marker 33 on the time bar is specified with the use of a mouse of the input part 14, the indication information of the point p of the material information a or of the marker 33 of the destination information A is fed into the control part 15 from the input part 14. The control part 15 calculates the time address value from the coordinates of the point p or the marker 33. The display control part 16 receives the point information thereof so as to effect the first digital display operation or the second digital display operation for digitally displaying it on the time display portion 29. At the same time, the optional information corresponding to the point p, the marker 33 is called from the information storage part so as to reproduce it by the synchronization control part 17. By the specification of the optional point on the time bar like this, the display of the time address value and the reproduction of the data are effected. The markers 30, 31, 32, 33, 34 are marks for storing the points on the time bars. When the accessing is effected onto the same point on the time bar with the mouse, keep the marker marking on the point previously, and the same point is to be specified simply by the choice of the marker.

In the editing operation, in order to insert the information corresponding to between the p-q of the material information a into the position of the information corresponding to the point r of the picture information M, the optional point p and the optional point q on the time bar of the material information a are specified by the use of the mouse of the input part 14 to specify the optional point r on the time bar of the destination information A. The construction information of fetching the information between the p-q of the material information a from the input part 14 to the control part 15 and the arrangement information of inserting the fetched information into the position of the point r of the picture information M are fed to the control part. The control part calls the portion of the material information corresponding to between the p-q of the a from the picture information storage part 11 to build-in the material information in the optional position of the destination information corresponding to the point r so as to produce the new destination information M for storing the destination information M in the picture information storage part 11. At the same time, the portion which has the length proportional to the reproduction time of the new destination information M, and is newly built in displays the time bar the same in color as the original material by the display control part 17.

The same things can be said even about the other edition operations such as copying, deleting, and so on.

Also, in the above-description, the editing operation of the picture information has been described. The same things can be said even about the audio and the text.

When the optional coordinate t is specified with the mouth in the abscissas axis direction in the synchronizing, reproducing operations, the control part reads the respective destination information corresponding to the point t from the picture information storage part, the text information storage part, the audio information storage part in accordance with the indication information of effecting the synchronizing, reproducing operations from the position of the coordinate t from the input part so as to effect the reproducing operation at the same time by the synchronization control output part.

In the present embodiment, the mass storage apparatus is adapted to be digitally stored. However, the mass storage apparatus for storing the information is not restricted to it. For example, a capacity storage apparatus for storing analog data may obtain, also, the same effects.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A data editing apparatus comprising:

a plurality of information storage parts each for storing a plurality of material information data and corresponding destination information data associated with the plurality of material information data, each corresponding destination information data indicative of a plurality of selected material information data arranged on a time basis;

an input part for outputting, in response to user operating instructions, (a) first input information data for specifying material information data from among the plurality of material information data, (b) second input information data denoting a timewise arrangement condition of the material information data specified by the first data information data, and (c) third input information data denoting a time related address location of the plurality of material information data and the corresponding destination information data;

a control part, operatively coupled to said plurality of information storage parts and to said input part, for (a) selecting material information data from among the plurality of material information data stored in the plurality of information storage parts in accordance with the first information data outputted from the input part, (b) arranging the thus selected material information data on the time basis in accordance with the second input information data outputted from the input part to produce the destination information, and (c) storing the destination information in the corresponding information storage part;

a display control part, operatively coupled to said control part, for effecting (a) a material information data graphic display operation of displaying parallel material information graphics each having a respective displayed area proportional to a reproduction time of the plurality of material information data, (b) a destination information graphic display operation of displaying parallel destination information graphics each having a respective displayed area proportional to a reproduction time of the corresponding destination information data, (c) a first digital display operation of digitally displaying a time address value associated with the material information graphics in accordance with the time related address location of the third input information data from the input part, and (d) a second digital display operation of digitally displaying the time address value associated with the destination information graphics in accordance with the time related address location of the third input information data from the input part; and, a synchronization control output part, operatively coupled to said control part and to said plurality of information storage parts, for synchronizing in time the plurality of destination information stored in the plurality of information storage parts during reproduction of the plurality of destination information.

2. An data editing apparatus comprising:

a plurality of information storage parts each for storing a plurality of material information data and corresponding destination information data associated with the plurality of material information data, each corresponding destination information data indicative of a plurality of selected material information data arranged on a time basis;

an input part for outputting, in response to user operating instructions, (a) first input information data for specifying material information data from among the plurality of material information data, (b) second input information data denoting a timewise arrangement condition of the material information data specified by the first input information data, and (c) third input information data denoting a time related address location of the plurality of material information data and the corresponding destination information data;

a control part, operatively coupled to said plurality of information storage parts and to said input part, for (a) selecting material information data from among the plurality of material information data stored in the plurality of information storage parts in accordance with the first information data outputted from the input part, (b) arranging the thus selected material information data on the time basis in accordance with the second input information data outputted from the input part to produce the destination information, and (c) storing the destination information in the corresponding information storage part;

a display control part, operatively coupled to said control part, for effecting (a) a material information data graphic display operation of displaying parallel material information graphics each having a respective displayed area proportional to a reproduction time of the plurality of material information data, (b) a destination information graphic display operation of displaying parallel destination information graphics each having a respective displayed area proportional to a reproduction time of the corresponding destination information data, (c) a first digital display operation of digitally displaying a time address value associated with on the material information graphics in accordance with the time related address location of the third input information data from the input part, (d) a second digital display operation of digitally displaying the time address value in an indication point of the destination information graphics indicated in accordance with the indication information from the input part (e) an operation of repeatedly graphically displaying the time address value associated with the material information graphics at a corresponding location on the material information graphics, and (f) an operation of repeatedly graphically displaying the time address value associated with the destination information graphics at a corresponding location on the material information graphics; and a synchronization control output part, operatively coupled to said control part and to said plurality of information storage parts, for synchronizing in time the plurality of destination information data stored in the plurality of information storage parts during reproduction of the plurality of destination information data.

3. A data editing apparatus comprising:

a plurality of information storage parts each for storing a plurality of material information data and corresponding destination information data associated with the plurality of material information data, each corresponding destination information data indicative of a plurality of selected material information data arranged on a time basis;

an input part for outputting, in response to user operating instructions, (a) first input information data for specifying material information data from among the plurality of material information data, (b) second input information data denoting a timewise arrangement condition of the material information data specified by the first input information data and (c) third input information data denoting a time related address location of the plurality of material information data and the corresponding destination information data;

a control part, operatively coupled to said plurality of information storage parts and to said input part, for (a) selecting material information data from among the plurality of material information data stored in the plurality of information storage parts in accordance with the first information data outputted from the input part, (b) arranging the thus selected material information data on the time basis in accordance with the second input information data outputted from the input part so as to produce the destination information, and (c) storing the destination information in the corresponding information storage part;

a display control part, operatively coupled to said control part, for effecting (a) a material information graphic display operation of displaying parallel material information graphics each having a respective displayed area proportional to a reproduction time of the plurality of material information data and each having a displayed color denoting a type of the material information data, (b) a destination information graphic display operation of displaying parallel destination information graphics each having a respective displayed area proportional to a reproduction time of the corresponding destination information data and each having a displayed color denoting a type of the destination information data, (c) a first digital display operation of digitally displaying a time address value associated with the material information graphics in accordance with the time related address location of the third input information data from the input part, (d) a second digital display operation of digitally displaying the time address value associated with the destination information graphics in accordance with the time related address location of the third input information data from the input part, (e) an operation of repeatedly graphically displaying the time address value associated with the material information graphics at a corresponding location on the material information graphics, and (f) an operation of repeatedly graphically displaying the time address value associated with the destination information graphics at a corresponding location on the material information graphics; and a synchronization control output part, operatively coupled to said control part and to said plurality of information storage parts, for synchronizing in time the plurality of destination information data stored in the plurality of information storage parts during reproduction of the plurality of destination information data.

* * * * *